US010642708B2

(12) United States Patent
Lin

(10) Patent No.: US 10,642,708 B2
(45) Date of Patent: May 5, 2020

(54) METHOD FOR EVALUATING USAGE OF AN APPLICATION BY A USER

(71) Applicant: Yu-Hsuan Lin, Taichung (TW)

(72) Inventor: Yu-Hsuan Lin, Taichung (TW)

( * ) Notice: Subject to any disclaimer, the term of this patent is extended or adjusted under 35 U.S.C. 154(b) by 746 days.

(21) Appl. No.: 15/163,262

(22) Filed: May 24, 2016

(65) Prior Publication Data

US 2016/0352848 A1 Dec. 1, 2016

(30) Foreign Application Priority Data

May 29, 2015 (TW) .............................. 104117410 A

(51) Int. Cl.
*G06F 9/44* (2018.01)
*G06F 11/34* (2006.01)
*H04L 29/08* (2006.01)

(52) U.S. Cl.
CPC .......... *G06F 11/3438* (2013.01); *H04L 67/22* (2013.01)

(58) Field of Classification Search
CPC ............. G06F 11/3466; G06F 11/3688; G06F 2201/865; G06F 11/3664; G06F 11/3409
USPC ........................................................ 717/131
See application file for complete search history.

(56) References Cited

U.S. PATENT DOCUMENTS

2013/0173351 A1* 7/2013 Livne ............... G06Q 10/06398
705/7.38
2014/0045157 A1 2/2014 Gross

FOREIGN PATENT DOCUMENTS

TW M455306 U 6/2013
TW M455306 U1 6/2013

OTHER PUBLICATIONS

Search Report appended to an Office Action, which was issued to Chinese counterpart application No. 201610364447.6 by the SIPO dated May 3, 2018, with an English translation thereof.

* cited by examiner

*Primary Examiner* — Chuck O Kendall
(74) *Attorney, Agent, or Firm* — Trop, Pruner & Hu, P.C.

(57) ABSTRACT

A method for evaluating usage of an application by a user includes: obtaining screen information regarding use of the portable device during a predetermined time period; determining a number of times of usage of an application for each day within the predetermined time period; calculating a usage duration for each time of execution of the application; calculating a daily usage duration for each day; selecting at least one usage duration for each day; calculating an evaluation value based on one of the at least one usage duration, the number of times of usage of the application for each day, and the daily usage duration; and generating an evaluation result based on the evaluation value and a preset standard.

74 Claims, 14 Drawing Sheets

US 10,642,708 B2

METHOD FOR EVALUATING USAGE OF AN APPLICATION BY A USER

CROSS-REFERENCE TO RELATED APPLICATION

This application claims priority of Taiwanese Patent Application No. 104117410, filed on May 29, 2015.

FIELD

The disclosure relates to a method for evaluating usage of a portable device by a user, particularly to a method for evaluating the user using an application on the portable device.

BACKGROUND

Internet addiction refers to various kinds of excessive use of the Internet, which may result in interference with daily life. A survey conducted by the Ministry of Education of Taiwan shows that 20.40 percent of $4^{th}$ to $6^{th}$ graders are at high risk of developing Internet addiction, 23.70 percent of $7^{th}$ to $9^{th}$ graders are at high risk of developing Internet addiction, and 32.30 percent of $10^{th}$ to $12^{th}$ graders are at high risk of developing Internet addiction. Results of this survey suggest that approximately one out of five teenage students may probably develop Internet addiction.

One variation of the Internet addiction is associated with compulsive use of electronic devices such as a portable electronic device. A survey conducted by the Time magazine shows that 84 percent of people interviewed admitted that he/she cannot live without cellphone for a day. A research done by the Helsinki Institute for Information Technology and Intel Labs shows that a person with compulsive use of a smart phone may feel the need to check his/her smart phone every 10 minutes, and may do so for as much as 34 times a day.

Current ways for recording usage of the electronic device are not efficient and often underestimate the effect associated with frequent and brief uses of smart phones, since a total use time recorded is not significant.

It is thought by some health care professionals that treatment on a user with Internet addiction may be more difficult than addictive substances such as alcohol, tobacco and illicit drugs, as portable electronic devices have been thoroughly integrated into daily life. It is proposed that a more practical way to perform the treatment may be focusing on identifying an application which the user frequently uses (e.g., an instant messaging software) and attempting to prevent the user from access to that application, instead of preventing the user from using the portable electronic device altogether.

SUMMARY

Therefore, an object of the disclosure is to provide a method that provides a more accurate and informative analysis for determining whether a user is "addicted" to use of a portable device.

According to the disclosure, the method is for evaluating usage of a portable device by a user. The method may be implemented by a calculating module. The portable device includes a processor for executing at least one application, and a display for displaying the application.

The processor further activates the display in response to receipt of a first trigger signal, and deactivates the display in response to receipt of a second trigger signal. The method includes the following steps of:

a) obtaining screen information regarding use of the portable device, the screen information including occurrences of receipt of the first trigger signal and the second trigger signal by the processor for the application in each day within a predetermined time period spanning at least one day;

b) determining a number of times of usage of the application for each day within the predetermined time period based on the screen information obtained in step a);

c) calculating a usage duration for each time of execution of the application by the processor during the predetermined time period;

d) calculating a daily usage duration for each day within the predetermined time period by adding the usage duration for the time(s) of execution of the application in the day;

e) selecting, for each day within the predetermined time period, at least one usage duration from the usage duration(s) for the time(s) of execution of the application of the day;

f) calculating an evaluation value based on one of the at least one usage duration selected in step d) for each day within the predetermined time period, the number of times of usage of the application for each day within the predetermined time period as determined in step b), and the daily usage duration calculated in step d) for each day within the predetermined time period; and g) generating an evaluation result associated with usage of the portable device based on the evaluation value and a preset standard.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
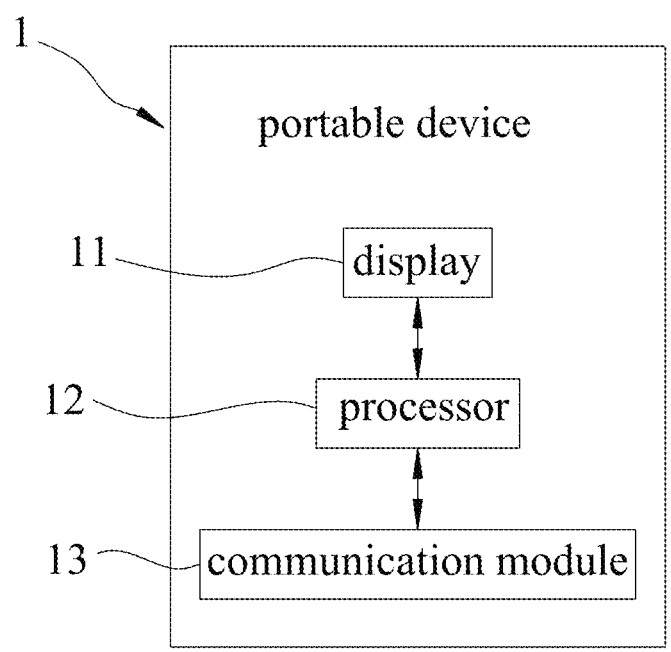
FIG. 1 is a block diagram illustrating a portable device according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 illustrates a portable device 1 that includes a display 11, a processor 12, and a communication module 13, according to one embodiment of the disclosure.

The portable device 1 may be embodied using, for example, a smart phone, a tablet, a wearable electronic device, and may be configured with or without communication functionality. In this embodiment, the portable device 1 is a smart phone with communication functionality.

The processor 12 executes one or more applications based on commands from a user. The application may include, for example, an instant messaging application.

The display 11 is configured to display content of the application that is executed by the processor 12. The processor 12 is configured to activate the display 11 (referred to as a screen-on event) in response to a first trigger signal (S1), and to deactivate the display 11 (referred to as a screen-off event) in response to a second trigger signal (S2) while the display 11 is activated. A time period between a screen-on event and a corresponding screen-off event may be referred to as a use epoch. On the other hand, a time period between a screen-off event and a subsequent screen-on event may be referred to as a non-use epoch.

According to one embodiment, the first trigger signal (S1) may be one of a touch signal received by the display 11 and/or to a physical button (not shown in the drawings) of the portable device 1, an audio signal, and an authentication signal such as a password, a retinal scanning signal, etc. The second trigger signal (S2) may be one similar to the first trigger signal (S1).

Figure 2:
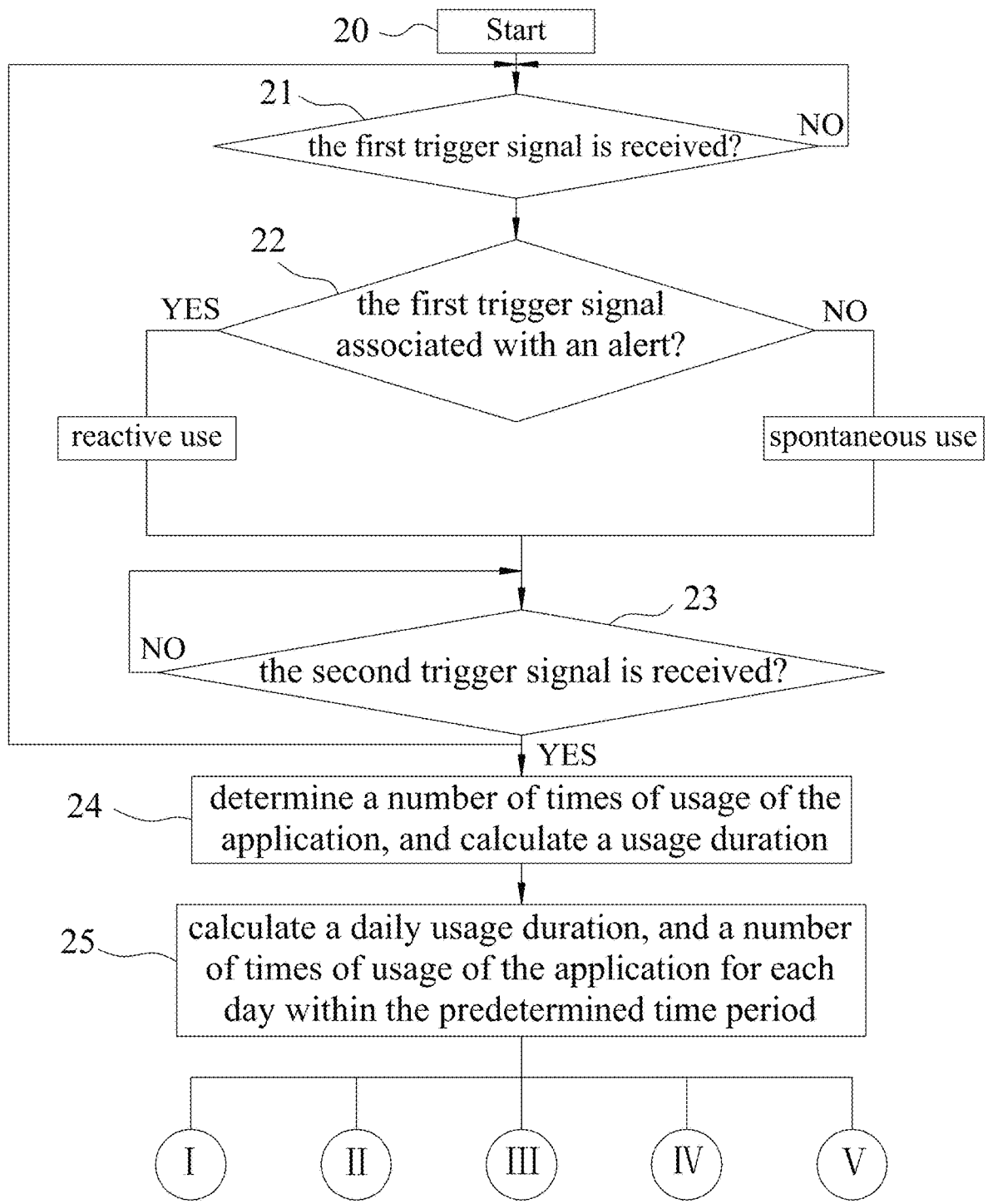
FIG. 2 is a flowchart illustrating steps of a method for evaluating usage of the portable device by the user according to one embodiment of the disclosure.

FIG. 2 is a flowchart illustrating steps of a method for evaluating usage of the portable device 1 by the user according to one embodiment of the disclosure. Specifically, the term "usage of the portable device 1" may imply the user using an application executed by the portable device 1.

In this embodiment, the processor 12, executing an evaluating application program, serves as a calculating module for implementing the method.

In step 21, the processor 12 determines whether the first trigger signal (S1) is received. When it is determined by the processor 12 that the first trigger signal (S1) is received, the flow proceeds to step 22. Otherwise, the flow goes back to step 21.

In step 22, the processor 12 determines whether the receipt of the first trigger signal (S1) is associated with a notification generated by the portable device 1. When it is determined by the processor 12 that the first trigger signal (S1) is associated with the notification, the processor 12 is configured to categorize the resulting execution of the application as a reactive use. Otherwise, the processor 12 categorizes the resulting execution of the application as a proactive use.

Specifically, the categorization "reactive use" indicates the use of the portable device 1 in response to the notification. For example, the notification may be one of a push alert, an incoming text message, a ringtone, a vibration, and a flashing light. On the other hand, the categorization "proactive use" indicates that the user proactively decides to use the portable device 1.

In practice, the number of proactive uses, which are not in response to any notification (e.g., phone ringing indicating an incoming call, receipt of a text message, etc.) may be more related to the Internet addiction/smartphone addiction. Accordingly, in some embodiments, it may be beneficial to identify each execution of the application as one of the reactive use and the proactive use, and to interpret the resulting data separately.

In step 23, the processor 12 determines whether the second trigger signal (S2) is received. When it is determined by the processor 12 that the second trigger signal (S2) has been received, the flow proceeds to step 24. Otherwise, the flow goes back to step 23.

It should be noted that for each occurrence of receipt of the first trigger signal (S1) and the second trigger signal (S2), a time stamp is recorded and associated with the occurrence.

While performing steps 21 to 23, information is gathered by the processor 12. The information gathered in steps 21 to 23 is referred to as screen information regarding use of the portable device 1. Specifically, the screen information includes occurrences of receipt of the first trigger signal (S1) and the second trigger signal (S2) by the processor 12 for the application. In this case, the gathering of screen information may persist for a predetermined time period (M) spanning at least one day (e.g., a month).

In step 24, based on the screen information, the processor 12 determines a number of times of usage (F) of the application, and calculates a usage duration (T) for each time of execution of the application by the processor 12.

Specifically, the number of times of usage F of the application is incremented by 1 for each receipt of the first trigger signal (S1) and the second trigger signal (S2) for the application. The usage duration is a time period between the occurrences of receipt of the first trigger signal (S1) and the second trigger signal (S2).

In this embodiment, only one application is considered so the number of times of usage (F) of the application is for the one application. In other embodiments, when a plurality of applications are executed during the usage duration, all applications will be considered as being executed during that usage duration.

In step 25, the processor 12 calculates a daily usage duration ($T_{all}$) for each day within the predetermined time period (M), and a number of times of usage (F) of the application in each day within the predetermined time period (M). Specifically, the daily usage duration ($T_{all}$) of one day is calculated by adding the usage durations for all times of execution of the application in the one day.

Figure 8:
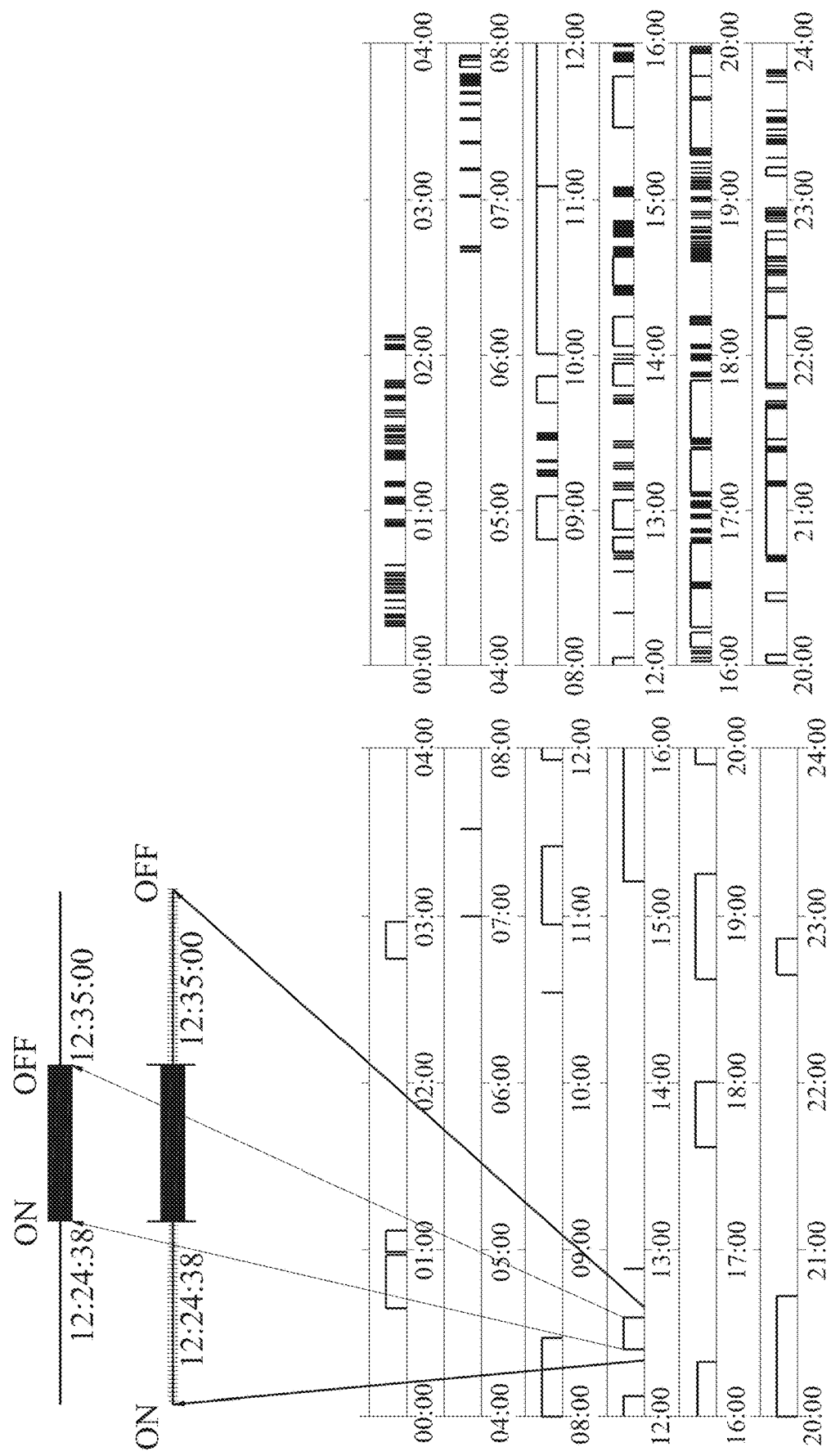
FIG. 8 illustrates screen information associated with two users, respectively, according to one embodiment of the disclosure.

In an example shown in FIG. 8, screen information associated with two users A and B for one day is shown.

It can be seen that, for the portable device of user A, a first trigger signal (S1) is received at 12:24:38, and a second trigger signal (S2) is received at 12:35:00. In such a case, the number of times of usage (F) calculated is incremented by one and the daily usage duration ($T_{all}$) calculated is increased by 10 minutes and 22 seconds, or 622 seconds.

Afterward, the information calculated above may be used in an evaluation process to determine whether the user is indeed excessively using the application. In the evaluation process, at least one usage duration (T) is selected from the usage durations for the times of execution of the application in each day within the predetermined time period (M).

In the disclosure, a number of five different evaluation processes, labeled respectively as (I), (II), (III), (IV), and (V) are provided.

Figure 3:
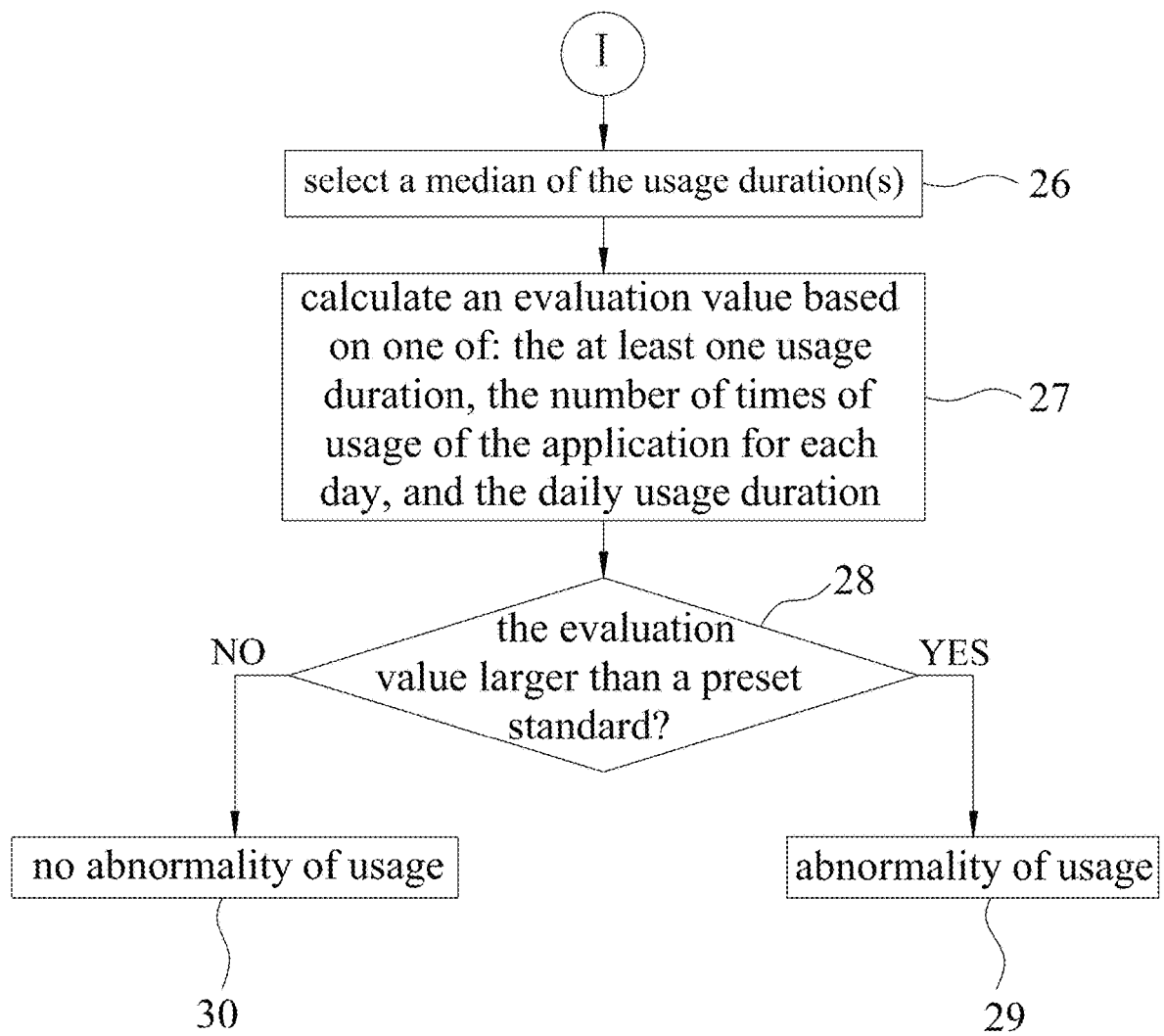
FIGS. 3 to 7 are flowcharts, each illustrating steps of a respective evaluation process in the method, according to one embodiment of the disclosure.

FIG. 3 illustrates steps of a first evaluation process (I) according to one embodiment of the disclosure.

In step 26, for each day within the predetermined time period (M), the processor 12 selects a median ($T_M$) of the usage duration(s) for the time(s) of execution of the application during the day to serve as the at least one usage duration. It is known that, in other embodiments, other percentiles (e.g., 25%, 75%, etc.) may be selected.

Taking the example of FIG. 8, for the portable device of user A, the number of times of usage (F) of the day is 19 and the daily usage duration ($T_{all}$) is 25121 seconds. The median one of the 19 uses is then determined to be the $10^{th}$ longest one, which is highlighted in FIG. 8.

In step 27, the processor 12 calculates an evaluation value based on one of: the at least one usage duration (T) selected in step 26 for each day within the predetermined time period (M) (i.e., the usage durations selected in step 26 for all the days within the predetermined time period (M)); the number of times of usage (F) of the application for each day within the predetermined time period (M) as determined in step 25 (i.e., the numbers of times of usage of the application for all the days within the predetermined time period (M)); and the daily usage duration ($T_{all}$) calculated in step 25 for each day within the predetermined time period (M) (i.e., the daily usage durations for all the days within the predetermined time period (M)).

For example, when the median of the usage duration(s) for each day, ($T_M$), is employed, an average of the medians of the usage duration(s) ($T_M$) for all the days within the predetermined time period (M) is calculated to serve as the evaluation value.

In other cases, an average of the numbers of times of usage (F) of the application for all the days within the predetermined time period (M), or an average of the daily usage durations ($T_{all}$) for all the days within the predetermined time period (M) may be calculated to serve as the evaluation value.

In step 28, the processor 12 generates an evaluation result associated with usage of the portable device 1 based on the evaluation value and a preset standard. The preset standard may include a threshold number (L) for comparison with the evaluation value.

For example, in this embodiment, the preset standard includes a threshold number regarding the number of times of usage (F) of the application, and the threshold number (L) equals to 68.4. Referring to the example in FIG. 8, and assuming that there is only one day within the predetermined time period (M), (the average of) the number of times of usage (F) for the user A equals 19, and (the average of) the number of times of usage (F) for the user B equals 211.

In this embodiment, when the evaluation value is larger than the threshold number (L), the flow proceeds to step 29, and the evaluation result thus generated indicates abnormality of usage of the portable device 1. On the other hand, when the evaluation value is no larger than the threshold number (L), the flow proceeds to step 30, and the evaluation result thus generated indicates no abnormality of usage of the portable device 1.

That is to say, when the number of times of usage (F) is taken into consideration, the user B in the example of FIG. 8 is considered to have abnormality of usage of the portable device 1. However, since the screen information indicates that the user A tends to use the portable device 1 longer for each time of execution (the median of the usage durations is 622 seconds, while the median of the usage durations for the user B is 283 seconds), additional evaluation may be performed to determine whether the user A have abnormality of usage of the portable device 1 as well.

It is noted that the method as described above may be utilized in various fields. For example, in the medical field, the method may be used to determine whether a subject is at high risk of developing Internet addiction. In terms of human resources, the method may be used to determine work efficiency by a subject (e.g., an employee). In a commercial application, the method may be used to determine how an application is used by a subject (e.g., a customer).

Figure 4:
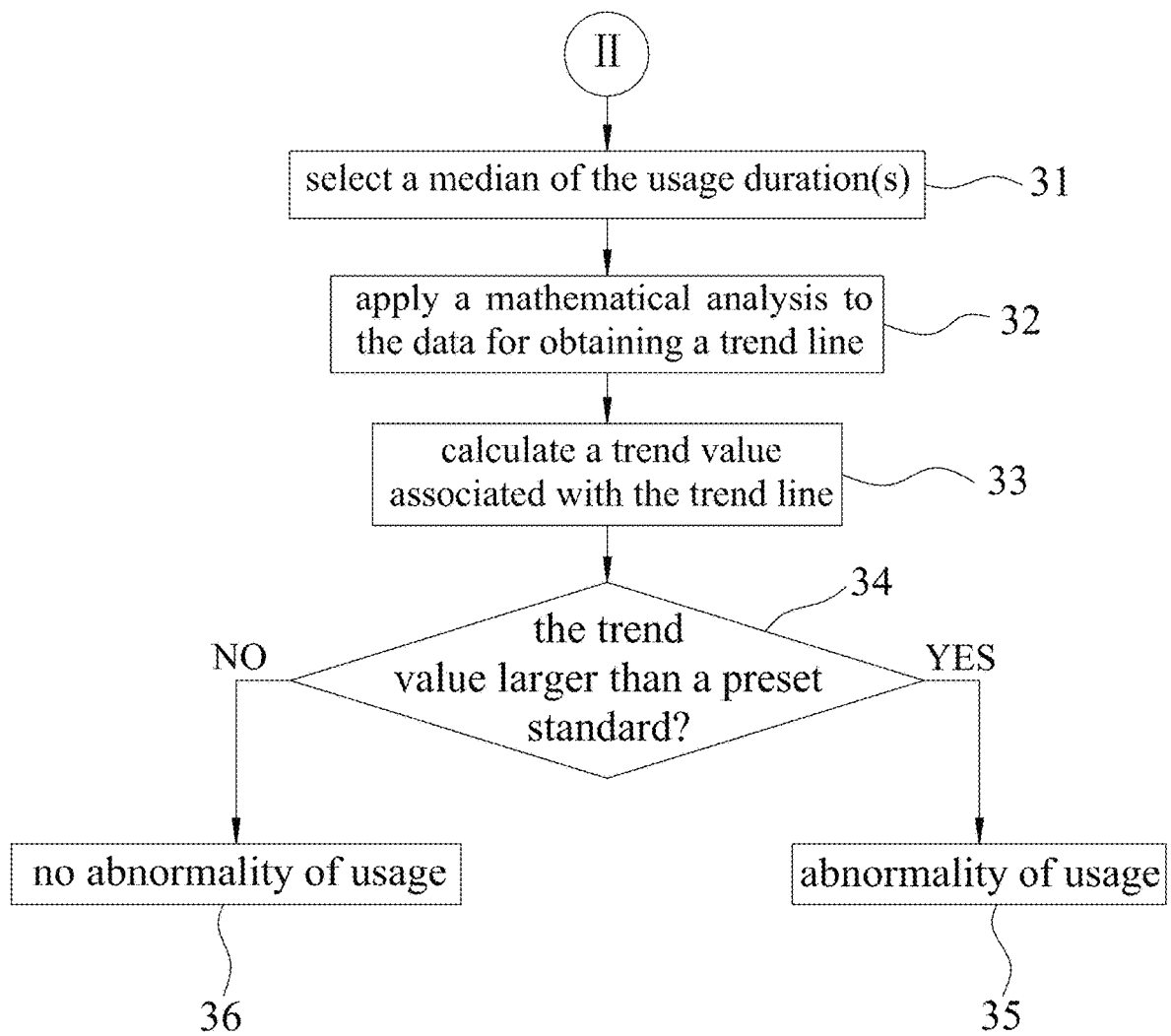

FIG. 4 illustrates steps of a second evaluation process (II) according to one embodiment of the disclosure.

In step 31, for each day within the predetermined time period (M), the processor 12 selects a median ($T_M$) of the usage duration(s) for the time(s) of execution of the application during the day to serve as the at least one usage duration.

In step 32, the processor 12 applies a mathematical analysis to the data calculated in the previous steps for obtaining a trend line. The mathematical analysis is selected from the group consisting of a linear analysis, a non-linear analysis, and a spectral analysis. Moreover, the linear analysis may be the linear regression analysis, the non-linear analysis may be the empirical mode decomposition (EMD), and the spectral analysis may be the Fourier transform. In this embodiment, the EMD is employed.

For example, when the mathematical analysis is applied to the number of times of usage F of the application for each day within the predetermined time period (M), a trend line IMF-F associated with the number of times of usage (F) of the application during the predetermined time period (M) may be obtained.

Similarly, when the mathematical analysis is applied to the daily usage duration ($T_{all}$) in each day within the predetermined time period (M), a trend line IMF-T associated with the daily usage duration ($T_{all}$) of the application during the predetermined time period (M) may be obtained.

When the mathematical analysis is applied to the median ($T_M$) of the usage duration(s) for the times of execution of the application for each day within the predetermined time period (M), a trend line IMF-M associated with the median ($T_M$) of the usage duration(s) during the predetermined time period (M) may be obtained.

Moreover, the mathematical analysis may be applied to a variance of one of the above mentioned statistics (i.e., the number of times of usage (F) of the application, the daily usage duration ($T_{all}$), and the median ($T_M$) of the usage duration(s)). As a result, a trend line IMF-V associated with the variance may be obtained.

Figure 9:
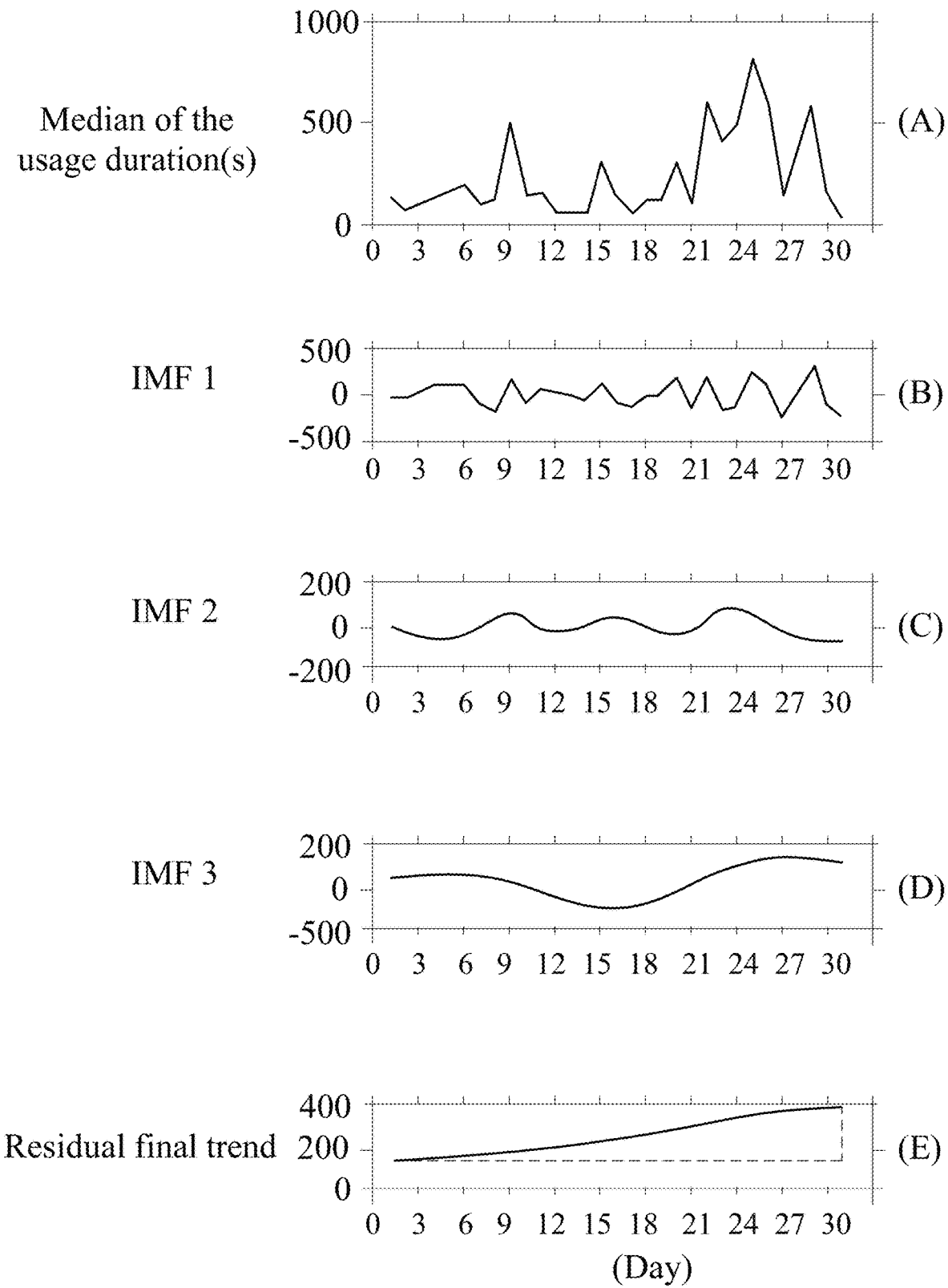
FIG. 9 illustrates steps of applying the empirical mode decomposition (EMD) to the screen information.

FIG. 9 illustrates steps for applying the EMD to the medians ($T_M$) of the usage duration (s) for the time (s) of execution of the application of all the days within the predetermined time period (M). The medians ($T_M$) are plotted to form a data curve in part (A) of FIG. 9.

Specifically, all local maxima and local minima in the data curve in part (A) of FIG. 9 are identified. Then, a cubic spline line is employed to connect all local maxima in the data curve as an upper envelope. Similarly, a cubic spline line is employed to connect all local minima in the data curve as a lower envelope.

Afterward, the processor 12 obtains a mean by averaging the upper envelope curve and the lower envelope curve, and calculates a first component by comparing the data curve and the mean envelope. The first component satisfied the definition of an intrinsic mode function (IMF).

The above steps are iterated to extract multiple IMFs until a residual component, as shown in part (E) of FIG. 9, is obtained (that is, no more IMF can be further extracted). In this embodiment, three IMFs (as shown in parts (B), (C) and (D) of FIG. 9, respectively) are obtained. The residual component thus obtained serves as the trend line.

The trend line obtained in this manner is stripped of outliers that have values too high or too low, and is therefore in a more stable condition for analysis.

In step 33, the processor 12 calculates a trend value ($IMF_v$) associated with the trend line obtained in step 32 (one of IMF-F, IMF-T, IMF-M, and IMF-V) to serve as the evaluation value. The trend value ($IMF_v$) may be one of a slope of the trend line and a difference between a maximum value and a minimum value of the trend line. In this embodiment, the slope of the trend line is employed.

In step 34, the processor 12 generates an evaluation result associated with usage of the portable device 1 based on the evaluation value and a preset standard. The preset standard may include a threshold trend value (C) for comparison with the evaluation value. In this embodiment, the threshold trend value (C) is 0.

In this embodiment, when the slope of the trend line or the difference between the maximum and minimum values of the trend line is larger than 0 (as shown in part (E) of FIG. 9), the flow proceeds to step 35, and the evaluation result thus generated indicates an increasing trend of usage. That is to say, the number of times of usage of the application or the usage duration for each time of execution of the application is indicated to be "trending up".

On the other hand, when the slope of the trend line or the difference between the maximum and minimum values of the trend line is no larger than 0, the flow proceeds to step 36, and the evaluation result thus generated indicates a decreasing trend of usage. That is to say, the number of times of usage of the application or the usage duration for each time of execution of the application is indicated to be "trending down". In this embodiment, the increasing trend of usage indicates abnormality of usage of the portable device 1.

It is noted that the method as described above may be utilized in various fields. For example, in the medical field, the method may be used to determine whether a subject is at high risk of developing Internet addiction based on the trend value. In terms of human resources, the method may be used to determine work efficiency by a subject (e.g., an employee). In a commercial application, the method may be used to determine how an application is used by a subject (e.g., a customer) over time, or how the customer "sticks" to the application (e.g., which mobile game is more addictive).

Figure 5:
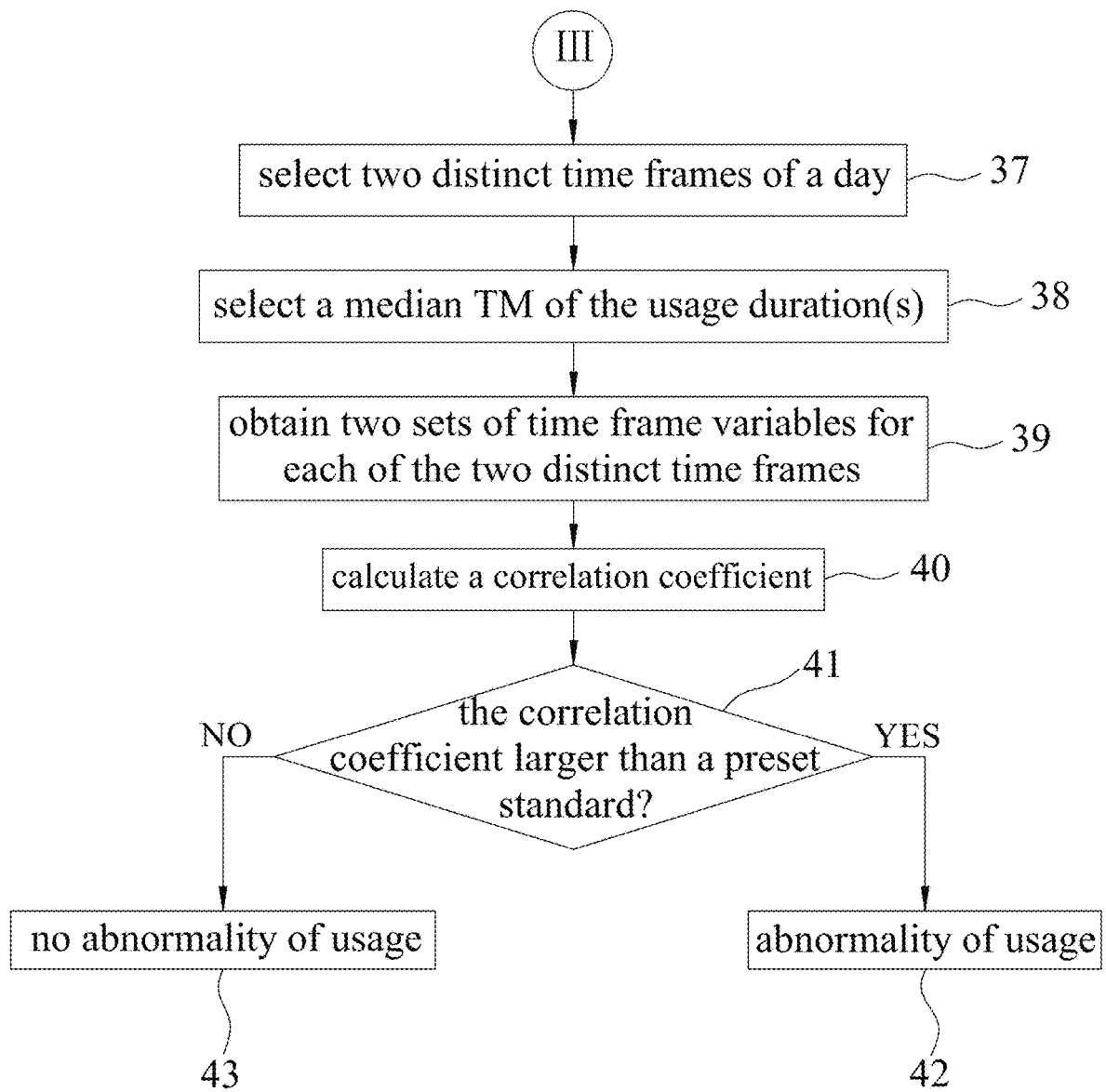

FIG. 5 illustrates steps of a third evaluation process (III) according to one embodiment of the disclosure.

Figure 10:
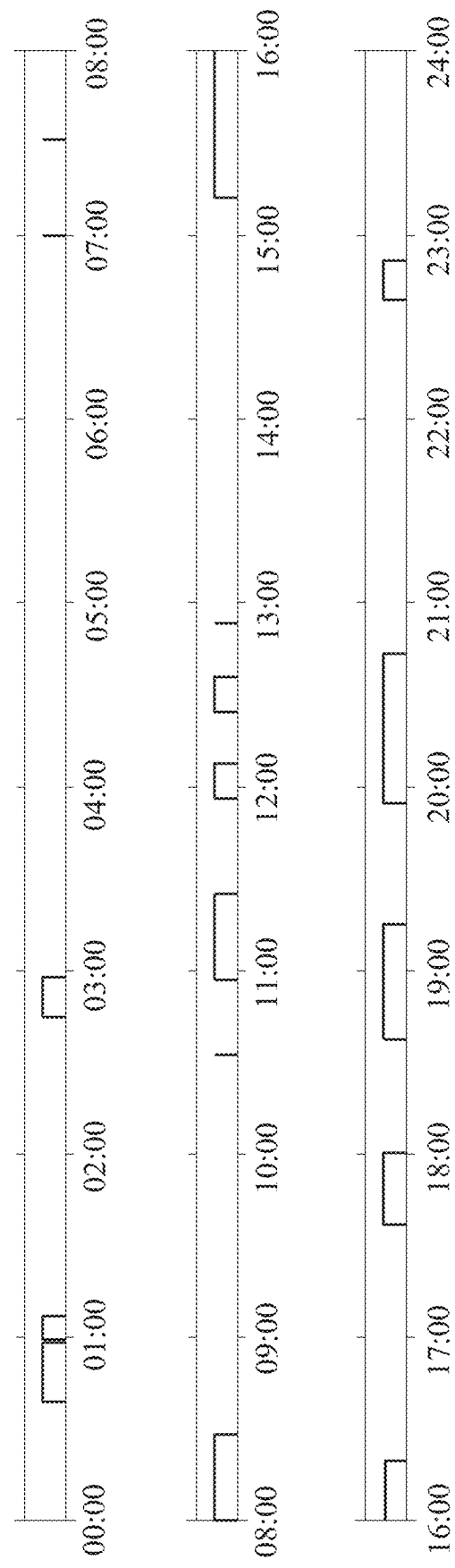
FIG. 10 illustrates the screen information presented in three different time frames.
Figure 11:
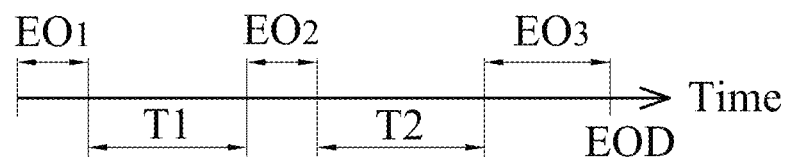
FIG. 11 illustrates the screen information being used for calculating a dependency value.

In step 37, the processor 12 selects two distinct time frames of a day. The two distinct time frames may be two of the following time frames 00:00-08:00, 08:00-16:00 and 16:00-24:00 (see FIG. 10). In this embodiment, the time frames 08:00-16:00 and 16:00-24:00 are employed.

In step 38, for each day of the predetermined time period (M), the processor 12 selects a median ($T_M$) of the usage duration(s) for the time(s) of execution of the application during the day to serve as the at least one usage duration.

In step 39, the processor 12 calculates, for each day of a preset number of selected days selected from the days within the predetermined time period (M), one of: a number of times of usage (F) of the application within each of the two distinct time frames of the day; an accumulated usage duration ($T_p$) within each of the two distinct time frames of the day which is an accumulation of usage durations (T) for the times of execution of the application within the distinct time frame of the day; and a median of the usage duration(s) ($T_M$) for the time(s) of execution of the application within each of the two distinct time frames of the day, so as to obtain two sets of time frame variables respectively for the two distinct time frames for the preset number of selected days (i.e., the total number of time frame variables obtained in this step is twice the preset number). In this embodiment, selected days include the total number of days within the predetermined time period (M), and may be for example, every other three days or every other fifteen days within the predetermined time period (M).

In step 40, the processor 12 calculates a correlation coefficient (r) of the two sets of time frame variables respectively associated with the two time frames to serve as the evaluation value.

In step 41, the processor 12 generates an evaluation result associated with usage of the portable device 1 based on the evaluation value and a preset standard. The preset standard may include a threshold coefficient number (R) for comparison with the evaluation value. In this embodiment, the threshold coefficient number (R) is 0.65.

In this embodiment, when the correlation coefficient (r) is larger than the threshold coefficient number (R), the flow proceeds to step 42, and the evaluation result thus generated indicates abnormality of usage of the portable device 1. On the other hand, when the correlation coefficient (r) is no larger than the threshold coefficient number (R), the flow proceeds to step 43, and the evaluation result thus generated indicates no abnormality of usage of the portable device 1.

It is noted that the method as described above may be utilized in various fields. For example, in the medical field, the method may be used to determine whether a subject is at high risk of developing Internet addiction based on the correlation between the subject's using his/her portable device in different time frames. In a human resources application, the method may be used to determine how works are done by a subject (e.g., an employee). In a commercial environment, the method may be used to determine how an application is used by a subject (e.g., a customer) in different time frames (e.g., which mobile game is more addictive).

Figure 6:
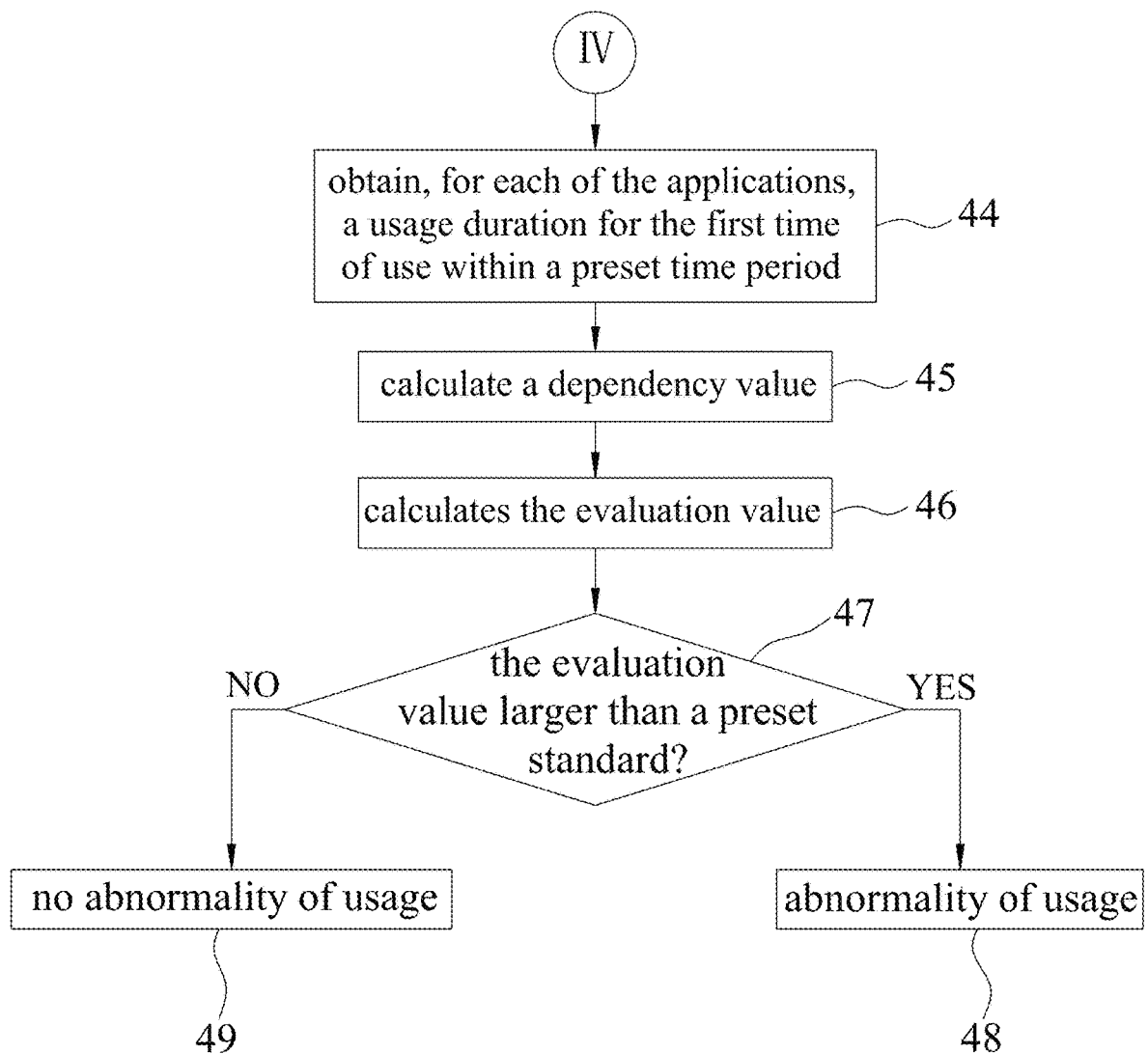

FIG. 6 illustrates steps of a fourth evaluation process (IV) according to one embodiment of the disclosure. In this embodiment, a number (n) of applications are executed by the processor 12.

In step 44, the processor 12 obtains, for each of the applications, a usage duration (T) for the first time of use within a preset time period of each day within the predetermined time period (M), i.e. the first usage as waking up (eye opener) or the last of a day as going to bed (eye closer). The usage duration (T) is determined by the receipt of the first and second triggering signals (S1, S2).

The preset time period has a predetermined time span (e.g., 1 hour), and starts after the user wakes up or before the user sleeps (after the user wakes up in this embodiment).

In another embodiment, the preset time period has a predetermined time span of 30 minutes, and starts in response to receipt of the first trigger signal (S1) when the processor 12 has not received the first trigger signal (S1) for a preset idle time period (e.g., 2 hours). That is to say, when it is determined that the processor 12 has received no first trigger signal (S1) for at least 2 hours, the preset time period starts in the instant of receipt of the first trigger signal (S1), and spans the next 30 minutes.

Afterward, in step 45, the processor 12 calculates a dependency value (D) which is associated with the preset time period for each day within the predetermined time period (M). Specifically, the following formulas are employed:

$$D = (EO_1 + EO_2 + \ldots EO_n)/EOD \quad (1)$$

$$EOD = EO_1 + EO_2 + \ldots EO_n + T_1 + \ldots + T_{(n-1)} \quad (2)$$

where in formula 1, D represents the dependency value, $EO_1$ represents a usage duration of use of a first one of the applications for the first time within the preset time period of the day, $EO_2$ represents a usage duration of use of a second one of the applications for the first time within the preset time period of the day, $EO_n$ represents a usage duration of use of an $n^{th}$ one of the applications for the first time within the preset time period of the day.

In formula 2, $T_1$ represents an idle duration between the first use (i.e., use for the first time) of the first one of the applications and the first use of the second one of the applications during which the display is inactive, and $T_{(n-1)}$ represents an idle duration between the first use of the $(n-1)^{th}$ one of the applications and the first use of the $n^{th}$ one of the applications during which the display 11 is inactive.

In step 46, the processor 12 calculates the evaluation value. It is noted that, in the case that a plurality of preset time periods are recorded during the predetermined time period (M) (for example, in this embodiment, the predetermined time period (M) spans 30 days, and for each day one preset time period is recorded), the evaluation value is defined as an average of the dependency values (D) calculated by the above formulas for all the days within the predetermined time period (M). On the other hand, in the case that one preset time period is recorded during the predetermined time period (M), the evaluation value is defined as the dependency value (D) calculated by the above formulas.

In step 47, the processor 12 generates an evaluation result associated with usage of the portable device 1 based on the evaluation value and a preset standard. In this embodiment, the preset standard includes a threshold dependency value (d) for comparison with the evaluation value.

In this embodiment, when the evaluation value is larger than the threshold dependency value (d), the flow proceeds to step 48, and the evaluation result thus generated indicates abnormality of usage of the portable device 1. On the other hand, when the evaluation value is no larger than the threshold dependency value (d), the flow proceeds to step 49, and the evaluation result thus generated indicates no abnormality of usage of the portable device 1.

Figure 7:
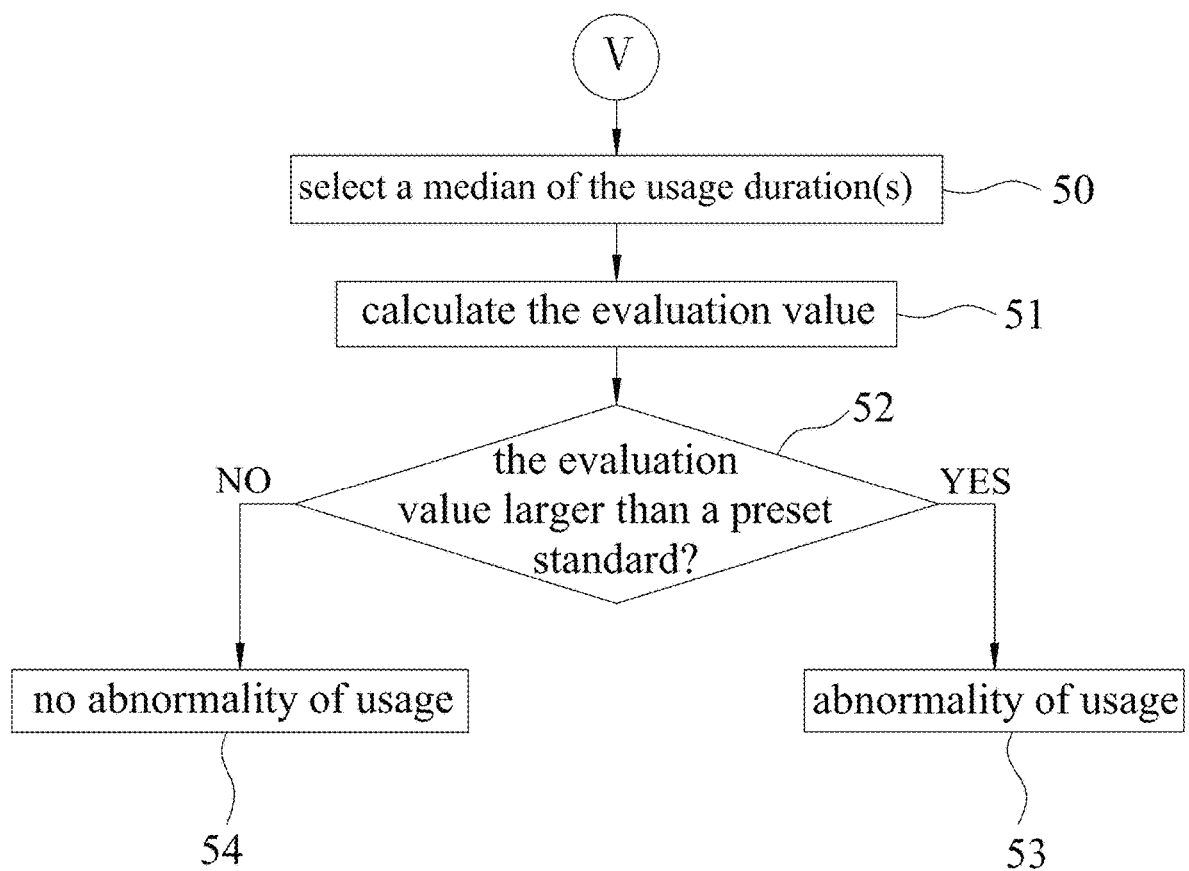

FIG. 7 illustrates steps of a fifth evaluation process (V) according to one embodiment of the disclosure.

In step 50, for each day within the predetermined time period (M), the processor 12 selects a median ($T_M$) of the usage duration(s) for the time(s) of execution of the application of the day to serve as the at least one usage duration.

In step 51, the processor 12 calculates the evaluation value. Specifically, the processor 12 calculates at least one of the following to serve as the evaluation value: an average of the numbers of times of usage (F) of the application for all the days within the predetermined time period (M); an average of the daily usage durations ($T_{all}$) for all the days within the predetermined time period (M); or a value associated with the at least one usage duration in the days within the predetermined time period (M) (e.g., an average of the medians of the usage duration(s) ($T_M$) for all the days within the predetermined time period (M)).

In step 52, the processor 12 generates an evaluation result associated with usage of the portable device 1 based on the evaluation value and a preset standard. In this embodiment, the preset standard includes an externally received threshold number (E) for comparison with the evaluation value. The threshold number (E) may be a number inputted by the user him/herself to serve as a self-imposed reference.

In this embodiment, when the evaluation value is larger than the threshold number (E), the flow proceeds to step 53, and the evaluation result thus generated indicates abnormality of usage of the portable device 1. On the other hand, when the evaluation value is no larger than the threshold number (E), the flow proceeds to step 54, and the evaluation result thus generated indicates no abnormality of usage of the portable device 1.

It is noted that the method as described above may be utilized in various fields. For example, in the medical field, the method may be used to determine whether a subject is at high risk of developing Internet addiction. In a commercial situation, the method may be used to determine how an application is used by a subject (e.g., a customer). That is to say, which mobile game is more addictive. For human resources, the method may be used to determine how works are done by a subject (e.g., an employee).

Figure 12:
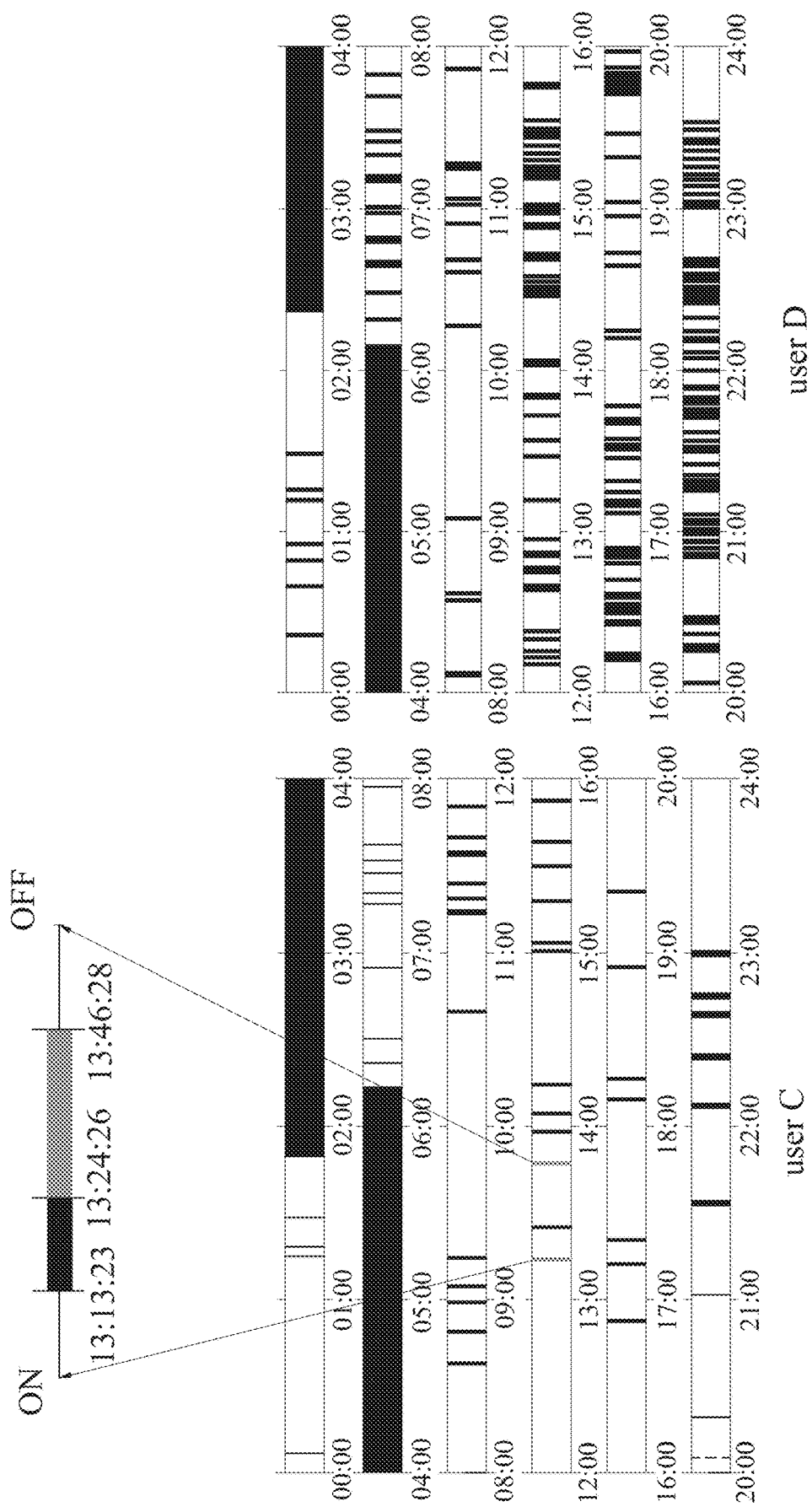
FIG. 12 illustrates screen information associated with two users, respectively, according to one embodiment of the disclosure.

FIG. 12 illustrates screen information associated with two users, respectively, according to one embodiment of the disclosure. It is noted that, in this embodiment, both the use epochs and the non-use epochs are taken into consideration.

Specifically, for a user C, one day of screen information is provided. For example, as highlighted, the processor 12 detects a screen-on event at 13:13:23, a screen-off event at 13:24:26 and a subsequent screen-on event at 13:46:28. As a result, the processor 12 identifies a use epoch between 13:13:23 and 13:24:26, and a non-use epoch between 13:24:26 and 13:46:28.

Afterward, a duration of each of the use epochs and the non-use epochs may be calculated. For example, the use epoch has a duration of 663 seconds, and the non-use epoch has a duration of 1322 seconds.

In this embodiment, for each day in the predetermined time period, one of the non-use epochs having a longest duration is identified as a sleep time period, indicating that the user may be asleep during that one of the non-use epochs (starting from 01:48:41 to 06:15:00 for the user C, and starting from 02:23:46 to 06:10:00 for a user D). The sleep time period thus identified is dismissed in later calculations.

For the user C, 35 non-use epochs are identified (excluding the sleep time period). A sum of durations of the 35 non-use epochs is 48527 seconds (i.e., the total time during which the user C is neither asleep nor using the application). Additionally, a median duration of the 35 non-use epochs is 1322 seconds.

For the user D, 231 non-use epochs are identified (excluding the sleep time period). A sum of durations of the 231 non-use epochs is 55557 seconds. Additionally, a median duration of the 231 non-use epochs is 304 seconds.

With the above information, a corresponding evaluation value may be calculated for each day of the predetermined time period. In this embodiment, two different evaluation processes may be employed.

Figure 13A:
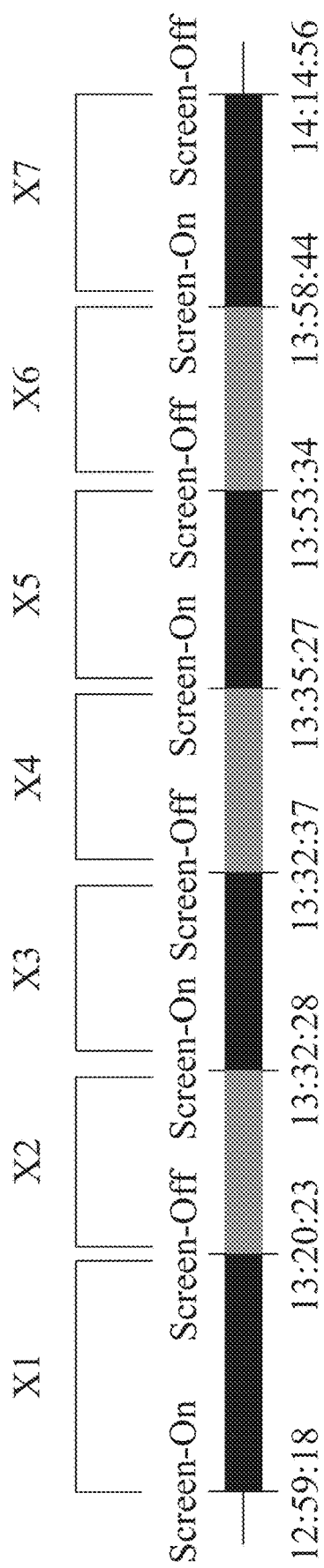
FIGS. 13A and 13B illustrate evaluation processes in the method, respectively, according to one embodiment of the disclosure.
Figure 13B:
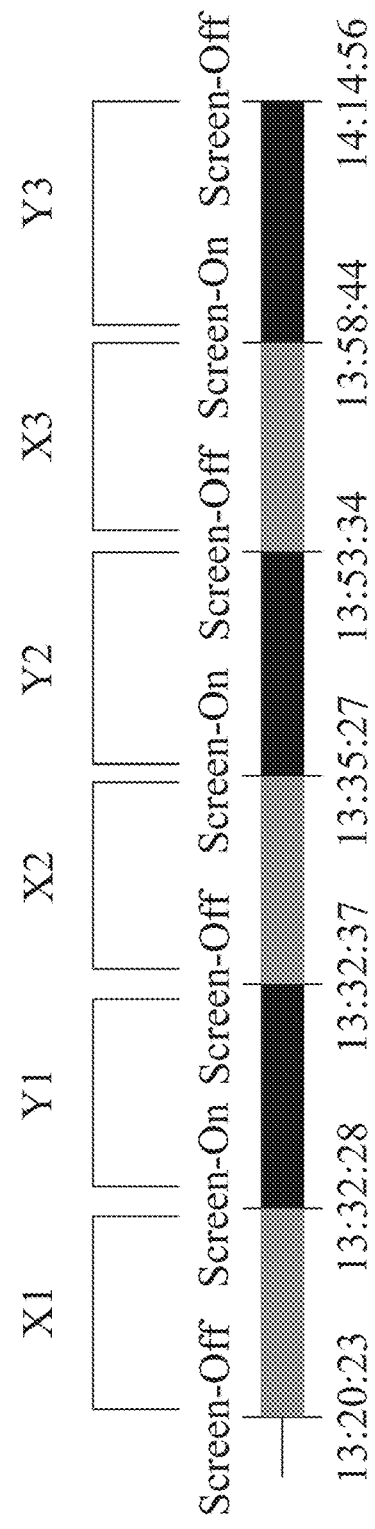

FIGS. 13A and 13B each illustrate successive use epochs and non-use epochs to be subjected to different evaluation processes.

Referring to FIG. 13A, each of the use epochs and non-use epochs is arranged sequentially, and a duration associated with each of the use epochs and non-use epochs is assigned with a number $X_i$. In FIG. 13A, a total of seven use epochs and non-use epochs are provided, with durations thereof being assigned $X_1$ to $X_7$.

Afterward, the evaluation value may be calculated. In this evaluation process, the evaluation value is a root mean square of the successive differences (RMSSD).

Specifically, the RMSSD can be obtained using the following equation:

$$EV = \sqrt{\frac{\sum_{i}^{n-1}(X_i - X_{i+1})^2}{n-1}}$$

where EV represents the evaluation value, and (n) is a number of combined use epochs and non-use epochs thus identified. For example, in the case of FIG. 13A, the number of combined use epochs and non-use epochs equals 7.

Afterward, the evaluation value may be compared with a preset standard to determine abnormality of usage. In this embodiment, the calculated evaluation value is 664.8 seconds, and the preset standard includes a threshold RMSSD value of 3500 seconds per day. As a result, the evaluation result thus generated indicates no abnormality of usage of the portable device 1.

Referring to FIG. 13B, each of the non-use epochs and use epochs is arranged sequentially, and a duration associated with each of the non-use epochs is assigned with a number $X_i$. On the other hand, a duration associated with each of the use epochs is assigned with a number $Y_i$.

In FIG. 13B, a number (n) of use epochs and the number (n) of non-use epochs are identified, respectively. Specifically, a total of six use and non-use epochs are provided (three each), with durations thereof being assigned $X_1$ to $X_3$, and $Y_1$ to $Y_3$, respectively.

Afterward, the evaluation value may be calculated. In this evaluation process, the evaluation value is a similarity index.

Specifically, the similarity index can be obtained using the following equation:

$$EV = \frac{\left(\sum_{i=j=1} |X_i - Y_j| + |X_i - Y_{j+1}| + |X_i - Y_{j+2}|\right)}{3n}$$

where EV represents the evaluation value.

Afterward, the evaluation value may be compared with a preset standard to determine abnormality of usage. In this embodiment, the preset standard includes a threshold EV of 857.5 seconds per day.

In various embodiments, the term "abnormality of usage" may indicate one or more of the following conditions of the subject: an increased usage, interference with daily life, a symptom of addiction, and a withdrawal symptom.

In one embodiment, the portable device 1 (which performs the method) may be communicating with a remote server 5, as shown in FIG. 12. After it is determined, using any one of the processes described above, that the abnormality of usage by the user is detected, the processor 12 may transmit an assistance notification to the remote server 5 so as to seek assistance. The assistance notification may include information associated with the user and/or the calculated evaluation value.

As a result, other people such as a doctor, a therapist, or family members of the user may be notified of the situation via the assistance notification and step in to provide appropriate assistance.

Figure 14:
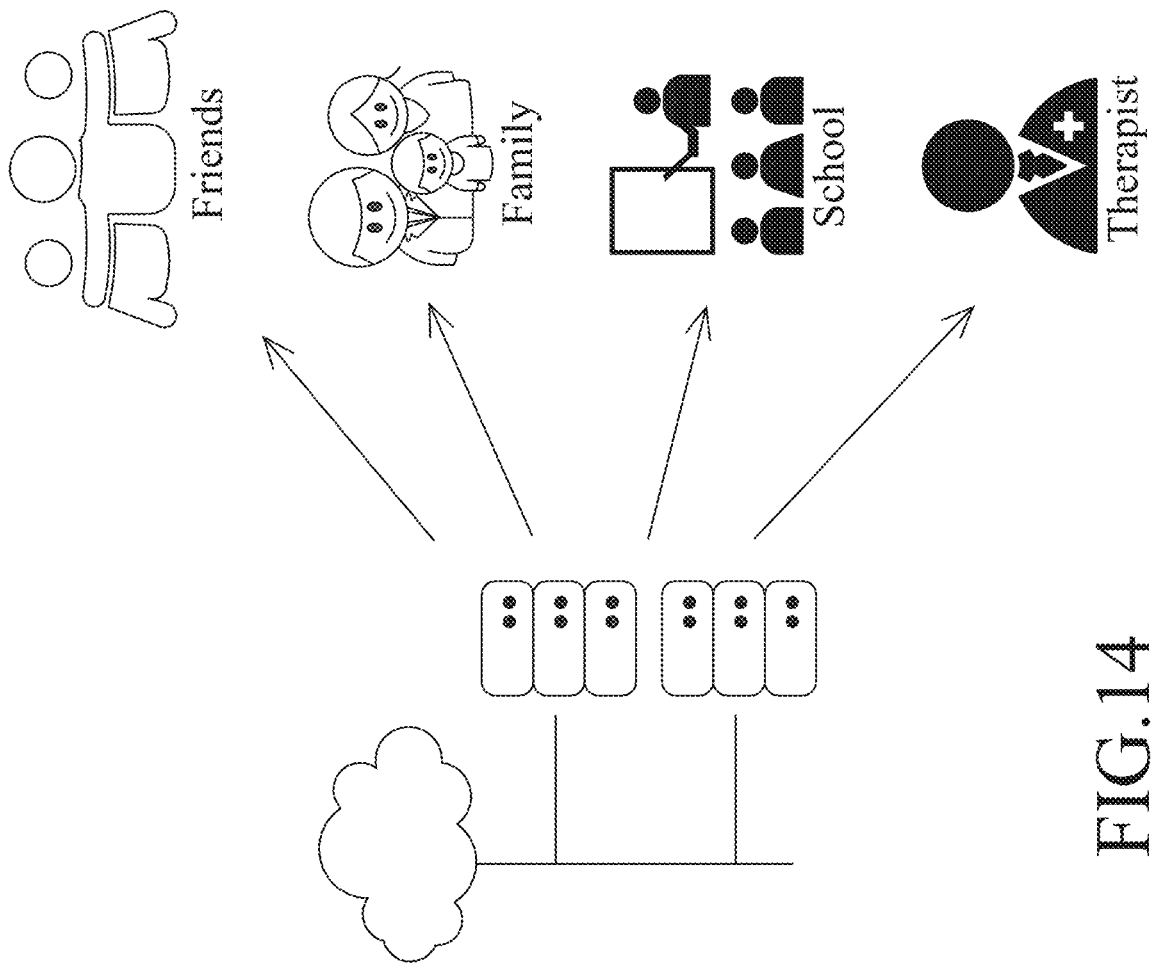
FIG. 14 illustrates a portable device coupled to a remote server that includes a calculating module for implementing a method for evaluating usage of the portable device by the user according to one embodiment of the disclosure.
Figure 14:
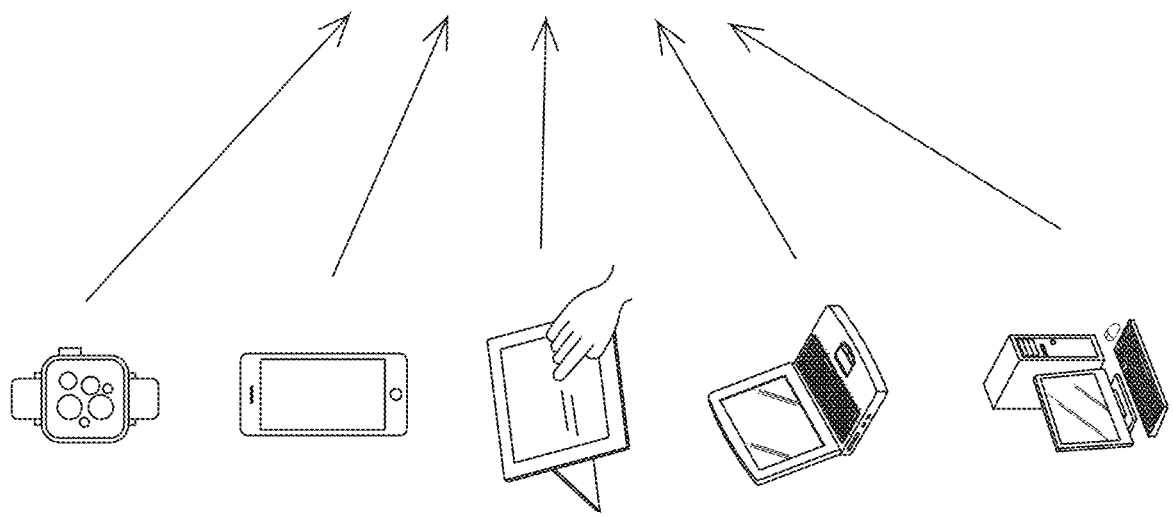

In one embodiment as illustrated in FIG. 14, the execution of one or more steps of the method may be implemented by the remote server 5 instead of the portable device 1. That is to say, the calculating module may be included in the remote server 5.

For example, in embodiments throughout the disclosure, the evaluation process may be executed by the calculating module included in the remote server 5, based on the screen information obtained by the portable device 1. After obtaining the evaluation result, the remote server 5 may be programmed to contact appropriate individuals (e.g., friends, family members, school faculty, a therapist). To sum up, the method as described in embodiments of the disclosure may provide the following advantages.

Firstly, at least the obtaining of the screen information is executed by the portable device 1 itself, and may therefore more accurate information regarding the use of the portable device 1 may be obtained.

Moreover, instead of simply accumulating the usage duration of the portable device 1 for a given period, the evaluation processes pay more attention to various aspects of usage of the portable device 1 as to determine whether abnormality of usage of the portable device 1 has occurred. For example, frequent but short uses of the portable device 1 may be correctly determined as abnormality of usage using the evaluation processes as described above.

Additionally, the embodiments provide multiple evaluation processes to obtain multiple evaluation values, in order to better understand how the user uses the portable device 1. When it is determined that the user may be addicted to using one or more particular applications (e.g., Facebook), certain measures (e.g., a reminder message, including positive and/or negative feedback, prohibiting access to the application, etc.) may be taken in an effort to reverse the situation.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for evaluating usage of an application by a user on an electronic device, the method being implemented by a calculating module, the electronic device including a processor for executing at least one application, and a display for displaying the application, the processor further activating the display in response to receipt of a first trigger signal, and deactivating the display in response to receipt of a second trigger signal, the method being implemented by a calculating module and comprising the following steps of:

a) obtaining screen information regarding use of the electronic device, the screen information including occurrences of receipt of the first trigger signal and the second trigger signal by the processor for the application in each day within a predetermined time period spanning a plurality of days;

b) determining a number of usage instances of the application for each day of the plurality of days within the predetermined time period based on the screen information obtained in step a);

c) calculating a usage duration for each usage instance of the application by the processor during the predetermined time period;

d) calculating a daily usage duration for each day of the plurality of days within the predetermined time period by adding the usage duration of each usage instance of the application during each day;

e) selecting, for each day of the plurality of days within the predetermined time period, a median usage duration from the usage durations of the usage instances of the application;

f) calculating an evaluation value based on an average of the median usage durations selected in step d) for each day of the plurality of days within the predetermined time period; and g) generating an evaluation result associated with usage of the application based on a comparison of the evaluation value based on the average of the median usage durations to a preset standard.

2. The method of claim 1, further comprising calculating the evaluation value based on at least one of: an average of the numbers of times of usage of the application for the days within the predetermined time period; and an average of the daily usage durations for the days within the predetermined time period.

3. The method of claim 1,
wherein the preset standard includes a threshold number for comparison with the evaluation value; and the method further comprises:
identifying an abnormality in usage of the portable device based on a determination that the evaluation value based on the average of the median usage durations is larger than the threshold number.

4. The method of claim 1, further comprising, after step b), the step of applying a mathematical analysis to the number of times of usage of the application for each day within the predetermined time period so as to obtain a trend line associated with the number of times of usage of the application during the predetermined time period; and
calculating a trend value associated with the trend line.

5. The method of claim 1, further comprising, after step c), the step of applying a mathematical analysis to the daily usage duration for each day within the predetermined time period so as to obtain a trend line associated with the daily usage duration of the application during the predetermined time period; and
calculating a trend value associated with the trend line.

6. The method of claim 1, further comprising, after step e), the step of applying a mathematical analysis to the median of the usage duration(s) for the time(s) of execution of the application for each day within the predetermined time period so as to obtain a trend line associated with the median of the usage duration(s) for the time(s) of execution of the application during the predetermined time period; and
calculating a trend value associated with the trend line.

7. The method of claim 1, further comprising, after step e), the step of applying a mathematical analysis to a variance of one of the following for each day within the predetermined time period so as to obtain a trend line associated with the variance during the predetermined time period:

the number of times of usage of the application;
the daily usage duration; and
the median of the usage duration(s) for the time(s) of execution of the application; and
calculating a trend value associated with the trend line.

8. The method of claim 5, wherein the mathematical analysis is selected from the group consisting of a linear analysis, a non-linear analysis, and a spectral analysis.

9. The method of claim 6, wherein the mathematical analysis is selected from the group consisting of a linear analysis, a non-linear analysis, and a spectral analysis.

10. The method of claim 7, wherein the mathematical analysis is selected from the group consisting of a linear analysis, a non-linear analysis, and a spectral analysis.

11. The method of claim 8, wherein, the linear analysis is the linear regression analysis, the non-linear analysis is the empirical mode decomposition (EMD), and the spectral analysis is the Fourier transform.

12. The method of claim 5, wherein, in step f), the trend value is one of:
a slope of the trend line; and
a difference between a maximum value and a minimum value of the trend line.

13. The method of claim 6, wherein, in step f), the trend value is one of:
a slope of the trend line; and
a difference between a maximum value and a minimum value of the trend line.

14. The method of claim 7, wherein, in step f), the trend value is one of:
a slope of the trend line; and
a difference between a maximum value and a minimum value of the trend line.

15. The method of claim 5, wherein:
in step g), the preset standard includes a threshold trend value for comparison with the trend value which serves as the evaluation value;
when the trend value is larger than the threshold trend value, the evaluation result thus generated indicates an increasing trend of usage;
when the trend value is smaller than the threshold trend value, the evaluation result thus generated indicates a decreasing trend of usage; and
at least one of the increasing trend of usage or the decreasing trend of usage indicates abnormality of usage of the portable device.

16. The method of claim 6, wherein:
in step g), the preset standard includes a threshold trend value for comparison with the trend value which serves as the evaluation value;
when the trend value is larger than the threshold trend value, the evaluation result thus generated indicates an increasing trend of usage;
when the trend value is smaller than the threshold trend value, the evaluation result thus generated indicates a decreasing trend of usage; and
at least one of the increasing trend of usage or the decreasing trend of usage indicates abnormality of usage of the portable device.

17. The method of claim 7, wherein:
in step g), the preset standard includes a threshold trend value for comparison with the trend value which serves as the evaluation value;
when the trend value is larger than the threshold trend value, the evaluation result thus generated indicates an increasing trend of usage;

when the trend value is smaller than the threshold trend value, the evaluation result thus generated indicates a decreasing trend of usage; and at least one of the increasing trend of usage or the decreasing trend of usage indicates abnormality of usage of the portable device.

18. The method of claim 1, the predetermined time period spanning a plurality of days, wherein in step f), the evaluation value is further calculated by:

selecting two distinct time frames of a day;

calculating, for each day of a preset number of selected day(s) selected from the days within the predetermined time period, one of a number of times of usage of the application within each of the two distinct time frames of the day, an accumulated usage duration within each of the two distinct time frames of the day which is an accumulation of usage duration(s) for the time(s) of execution of the application in the time frame of the day, and a median of the usage duration(s) for the time(s) of execution of the application within each of the two distinct time frames of the day, so as to obtain two sets of time frame variables for the preset number of day(s), the two sets being respectively associated with the two distinct time frames; and calculating a correlation coefficient of the two sets of time frame variables to serve as the evaluation value.

19. The method of claim 18, wherein in step g), the preset standard includes a threshold coefficient number for comparison with the correlation coefficient; and wherein step g) includes generating the evaluation result which indicates abnormality of usage of the portable device when the correlation coefficient is larger than the threshold coefficient number.

20. The method of claim 18, wherein the selected day(s) includes one of: all days within the predetermined time period; every other three days within the predetermined time period; and every other fifteen days within the predetermined time period.

21. The method of claim 18, wherein the two distinct time frames are selected from the following time frames: 00:00-08:00, 08:00-16:00 and 16:00-24:00.

22. The method of claim 1, the processor executing a number (n) of applications, wherein step e) includes, determining the evaluation value which is associated with a preset time period during each day within the predetermined time period based on a dependency value serving as the evaluation value, a usage duration of use of a first one of the applications for the first time within the preset time period during the day, a usage duration of use of a second one of the applications for the first time within the preset time period during the day, a usage duration of use of an $n^{th}$ one of the applications for the first time within the preset time period during the day, an idle duration between the use of the first one of the applications for the first time and the use of the second one of the applications for the first time during which the display is inactive, and an idle duration between the use of the $(n-1)^{th}$ one of the applications for the first time and the use of the $n^{th}$ one of the applications for the first time during which the display is inactive.

23. The method of claim 22, wherein the preset standard includes a threshold number, and the method further comprises:

identifying an abnormality in usage of the portable device based on a determination that the average of the median usage durations is larger than the threshold dependency value.

24. The method of claim 22, wherein the preset time period has a predetermined time span, and starts after the user wakes up or before the user sleeps.

25. The method of claim 22, wherein the preset time period has a predetermined time span, and starts in response to receipt of the first trigger signal when the processor has not received the first trigger signal for a preset idle time period.

26. The method of claim 1, wherein step g) includes further calculating at least one of the following to serve as the evaluation value: an average of the numbers of times of usage of the application for the days within the predetermined time period; an average of the daily usage durations for the days within the predetermined time period; or a value associated with the usage durations selected in step e) for the days within the predetermined time period;

wherein, in step g), the preset standard is received externally and includes an externally set threshold number for comparison with the evaluation value; and wherein the method further comprises identifying an abnormality in usage of the portable device based on a determination that the average of the median usage durations is larger than the externally set threshold number.

27. A method for evaluating usage of a portable device by a user, the method being implemented by a calculating module, the portable device including a processor for executing at least one application, and a display for displaying the application, the processor further activating the display in response to receipt of a first trigger signal, and deactivating the display in response to receipt of a second trigger signal, the method comprising the following steps of:

a) obtaining screen information regarding use of the portable device, the screen information including occurrences of receipt of the first trigger signal and the second trigger signal by the processor for the application in each day within a predetermined time period spanning a plurality of days;

b) determining a number of usage instances of the application for each day of the plurality of days within the predetermined time period based on the screen information obtained in step a);

c) calculating a usage duration for each usage instance of the application by the processor during the predetermined time period;

d) calculating a daily usage duration for each day of the plurality of days within the predetermined time period by adding usage duration of each usage instance of the application during each day;

selecting, for each day of the plurality of days within the predetermined time period, a median usage duration from the usage durations of the usage instances of the application;

calculating an average of the median usage durations selected for each day of the plurality of days within the predetermined time period;

e) applying a mathematical analysis to one of the number of times of usage of the application for each day of the plurality of days within the predetermined time period and the average of the median usage durations for each day within the predetermined time period, so as to obtain an associated trend line;

f) calculating a trend value associated with the trend line to serve as an evaluation value; and g) generating an evaluation result associated with usage of the portable device based on the evaluation value and a preset standard.

28. The method of claim 27, wherein the mathematical analysis is selected from the group consisting of a linear analysis, a non-linear analysis, and a spectral analysis.

29. The method of claim 28, wherein, the linear analysis is the linear regression analysis, the non-linear analysis is the empirical mode decomposition (EMD), and the spectral analysis is the Fourier transform.

30. The method of claim 27, wherein, in step f), the trend value is one of:
a slope of the trend line; and
a difference between a maximum value and a minimum value of the trend line.

31. The method of claim 27, wherein:
in step g), the preset standard includes a threshold trend value for comparison with the trend value which serves as the evaluation value;
when the trend value is larger than the threshold trend value, the evaluation result thus generated indicates an increasing trend of usage.

32. A method for evaluating usage of a portable device by a user, the method being implemented by a calculating module, the portable device including a processor for executing at least one application, and a display for displaying the application, the processor further activating the display in response to receipt of a first trigger signal, and deactivating the display in response to receipt of a second trigger signal, the method comprising the following steps of:
a) obtaining screen information regarding use of the portable device, the screen information including occurrences of receipt of the first trigger signal and the second trigger signal by the processor for the application in each day within a predetermined time period spanning a plurality of days;
b) determining a number of usage instances of the application for each day of the plurality of days within the predetermined time period based on the screen information obtained in step a);
c) calculating a usage duration for each usage instance of the application by the processor during the predetermined time period;
d) calculating a daily usage duration by adding the usage duration for each usage instance of the application during each day of the plurality of days within the predetermined time period;
e) selecting two distinct time frames in a day;
f) calculating, for each day of a preset number of selected day(s) selected from the days of the predetermined time period, a usage duration of each usage instance of the application within each of the two distinct time frames of the day, an accumulated usage duration within each of the two distinct time frames of the day which is an accumulation of the usage durations of the usage instances of the application within the time frame of the day, a median of the usage durations of the usage instances of the application within each of the two distinct time frames of the day, and an average of the median usage durations for each of the two distinct time frames of the day, so as to obtain two sets of time frame variables for the preset number of selected days, the two sets being respectively associated with the two distinct time frames;
g) calculating a correlation coefficient of the two sets of time frame variables to serve as an evaluation value; and h) generating an evaluation result associated with usage of the portable device based on the evaluation value and a preset standard;
wherein the two distinct time frames are selected from the following time frames: 00:00-08:00, 08:00-16:00 and 16:00-24:00.

33. The method of claim 32, wherein in step h), the preset standard includes a threshold coefficient; and the method further comprises:
identifying an abnormality in usage of the portable device based on a determination that the correlation coefficient is larger than the threshold coefficient number.

34. The method of claim 32, wherein the selected day(s) includes one of: all days within the predetermined time period; every other three days within the predetermined time period; and every other fifteen days within the predetermined time period.

35. A method for evaluating usage of a portable device by a user, the method being implemented by a calculating module, the portable device including a processor for executing a number (n) of applications, and a display for displaying the application, the processor further activating the display in response to receipt of a first trigger signal, and deactivating the display in response to receipt of a second trigger signal, the method comprising the following steps of:
obtaining screen information regarding use of the portable device, the screen information including occurrences of receipt of the first trigger signal and the second trigger signal by the processor for each of the number N of applications in each day within a predetermined time period spanning a plurality of days;
determining a number of usage instances of the N applications for each day of the plurality of days within the predetermined time period based on the obtained screen information;
calculating a usage duration for each usage instance of the N applications by the processor during the predetermined time period;
calculating a daily usage duration for each day of the plurality of days within the predetermined time period by adding the usage duration of each usage instance of the N applications during each day;
selecting, for each day of the plurality of days within the predetermined time period, a median usage duration from the usage durations of the usage instances of the N applications;
calculating an evaluation value by applying an intrinsic mode function to the median usage durations selected for the plurality of days; and
generating an evaluation result associated with usage of the portable device based on the evaluation value and a preset standard.

36. The method of claim 35, wherein calculating the evaluation value comprises applying a plurality of iterations of the intrinsic mode function until a residual value is generated along with the evaluation value.

37. The method of claim 35, wherein the predetermined time period has a fixed time span, and starts after the user wakes up or before the user sleeps.

38. The method of claim 35, wherein the predetermined time period has a fixed time span, and starts in response to receipt of the first trigger signal when the processor has not received the first trigger signal for a predetermined idle time period.

39. The method of claim 1, the calculating module being integrated into the portable device.

40. The method of claim 1, the portable device being one of a smartphone, a tablet, and a wearable electronic device, and being one with or without communication functionality.

41. The method of claim 1, the calculating module being included in a server that communicates with the portable device.

42. The method of claim 1, wherein in step a), the calculating module is programmed to:
   determine whether the receipt of the first trigger signal is associated with an notification generated by the portable device;
   categorize the resulting execution of the application as a reactive use when the determination is affirmative; and
   categorize the resulting execution of the application as a proactive use when the determination is non-affirmative.

43. The method of claim 42, wherein the notification generated by the portable device is one of a push alert, an incoming text message, a ringtone, a vibration, and a flashing light.

44. The method of claim 27, the calculating module being integrated into the portable device.

45. The method of claim 27, the portable device being one of a smartphone, a tablet, and a wearable electronic device, and being one with or without communication functionality.

46. The method of claim 27, the calculating module being included in a server that communicates with the portable device.

47. The method of claim 27, wherein in step a), the calculating module is programmed to:
   determine whether the receipt of the first trigger signal is associated with an alert generated by the portable device;
   categorize the resulting execution of the application as a reactive use when the determination is affirmative; and
   categorize the resulting execution of the application as a proactive use when the determination is non-affirmative.

48. The method of claim 32, the calculating module being integrated into the portable device.

49. The method of claim 32, the portable device being one of a smartphone, a tablet, and a wearable electronic device, and being one with or without communication functionality.

50. The method of claim 32, the calculating module being included in a server that communicates with the portable device.

51. The method of claim 32, wherein in step a), the calculating module is programmed to:
   determine whether the receipt of the first trigger signal is associated with an notification generated by the portable device;
   categorize the resulting execution of the application as a reactive use when the determination is affirmative; and
   categorize the resulting execution of the application as a proactive use when the determination is non-affirmative.

52. The method of claim 35, the calculating module being integrated into the portable device.

53. The method of claim 35, the portable device being one of a smartphone, a tablet, and a wearable electronic device, and being one with or without communication functionality.

54. The method of claim 35, the calculating module being included in a server that communicates with the portable device.

55. The method of claim 35, wherein in step a), the calculating module is programmed to:
   determine whether the receipt of the first trigger signal is associated with an notification generated by the portable device;
   categorize the resulting execution of the application as a reactive use when the determination is affirmative; and
   categorize the resulting execution of the application as a proactive use when the determination is non-affirmative.

56. The method of claim 3, wherein the abnormality of usage of the portable device indicates one of an increased usage, interference with daily life, a symptom of addiction, and a withdrawal symptom.

57. The method of claim 3, wherein the evaluation result generated in step g) indicates no abnormality of usage of the portable device when the evaluation value is no larger than the threshold number.

58. The method of claim 15, wherein the abnormality of usage of the portable device indicates one of increased usage, interference with daily life, a symptom of addiction, and a withdrawal symptom.

59. The method of claim 15, wherein the evaluation result generated in step g) indicates no abnormality of usage of the portable device when the evaluation value is no larger than the threshold number.

60. The method of claim 19, wherein the abnormality of usage of the portable device indicates one of increased usage, interference with daily life, a symptom of addiction, and a withdrawal symptom.

61. The method of claim 19, wherein the evaluation result generated in step g) indicates no abnormality of usage of the portable device when the evaluation value is no larger than the threshold number.

62. The method of claim 23, wherein the abnormality of usage of the portable device indicates one of increased usage, interference with daily life, a symptom of addiction, and a withdrawal symptom.

63. The method of claim 23, wherein the evaluation result generated in step g) indicates no abnormality of usage of the portable device when the evaluation value is no larger than the threshold number.

64. The method of claim 33, wherein the abnormality of usage of the portable device indicates one of increased usage, interference with daily life, a symptom of addiction, and a withdrawal symptom.

65. The method of claim 33, wherein the evaluation result generated in step g) indicates no abnormality of usage of the portable device when the evaluation value is no larger than the threshold number.

66. The method of claim 36, wherein the abnormality of usage of the portable device indicates one of increased usage, interference with daily life, a symptom of addiction, and a withdrawal symptom.

67. The method of claim 36, wherein the evaluation result indicates no abnormality of usage of the portable device when the evaluation value is no larger than the threshold number.

68. The method of claim 1, which is utilized in one of a medical use, a human resources use and a commercial use.

69. The method of claim 27, which is utilized in one of a medical use, a human resources use and a commercial use.

70. The method of claim 32, which is utilized in one of a medical use, a human resources use and a commercial use.

71. The method of claim 35, which is utilized in one of a medical use, a human resources use and a commercial use.

72. A method for evaluating usage of an application by a user on an electronic device, the method being implemented by a calculating module, the electronic device including a processor for executing at least one application, and a display for displaying the application, the processor further activating the display in response to receipt of a first trigger signal, and deactivating the display in response to receipt of a second trigger signal, the method comprising the following steps of:
- a) obtaining screen information regarding use of the electronic device, the screen information including occurrences of receipt of the first trigger signal and the second trigger signal by the processor for the application in each day within a predetermined time period spanning at least one day;
- b) identifying, during the at least one day, a plurality of use epochs each defined by an occurrence of receipt of the first trigger signal and a subsequent occurrence of receipt of the second trigger signal, and a plurality of non-use epochs each defined by an occurrence of receipt of the second trigger signal and a subsequent occurrence of receipt of the first trigger signal;
- c) calculating a duration for each of the use epochs and each of the non-use epochs, and defining one of the non-use epochs having a longest duration as a sleep time period;
- d) calculating an evaluation value based on the duration for each of the at least one use epoch, the at least one non-use epoch and the at least one sleep time period; and
- e) generating an evaluation result associated with usage of the application based on the evaluation value.

73. The method of claim 72, wherein step d) includes determining the evaluation value based on:

a number of combined use epochs and non-use epochs thus identified, and a duration of an $i^{th}$ one of the number (n) of use epochs and non-use epochs that are sequentially arranged.

74. The method of claim 72, wherein:

in step b), a number (n) of use epochs and the number (n) of non-use epochs are identified, respectively;

step d) includes determining the evaluation value based on:

a duration of an $i^{th}$ one of the use epochs, and a duration of a $j^{th}$ one of the non-use epochs.

* * * * *